United States Patent Office 3,052,535
Patented Sept. 4, 1962

3,052,535
RECOVERING LEAD FROM BY-PRODUCT LEAD MATERIALS
John Irwin Peters, Lancaster Village, Wilmington, Del., assignor to E. I. du Pont de Nemours and Company, Wilmington, Del., a corporation of Delaware
No Drawing. Filed Sept. 29, 1960, Ser. No. 57,146
6 Claims. (Cl. 75—77)

This invention relates to a process for recovering metallic lead from by-product lead matrials of the character of those produced in the manufacture of tetraethyllead.

Tetraethyllead has been manufactured commercially for many years by reacting an excess of ethyl chloride with lead-monosodium alloy. In such reaction, the sodium in the alloy is mostly converted to sodium chloride, about 25% of the lead in the alloy is converted to tetraethyllead, and most of the rest of the lead in the alloy is converted to metallic lead in finely divided form. After the reaction has been completed, the excess ethyl chloride is distilled off, and the reaction mass is then drowned in water and the tetraethyllead removed by steam distillation in the presence of a still aid which largely prevents agglomeration of the finely-divided metallic lead particles. The still residue comprises a suspension of the by-product lead particles in a dilute aqueous solution of sodium chloride. This suspension is conveyed to a sludge pit where it is allowed to settle to form an upper layer of aqueous solution of salt and a lower layer of wet sludge which is composed mainly of the finely-divided lead mixed with about 8% to about 20% by weight of the aqueous salt solution. The water layer is drawn off and the wet sludge is washed with water to remove most of the salt and then dried to remove most of the water.

The resulting dried by-product lead sludge is impure, containing sodium chloride, lead chloride, sodium hydroxide and, in some cases, lead sulfate, lead sulfide and lead chromate (formed by reaction of the lead with the still aid), usually in a proportion of less than 1% by weight. In addition, the lead particles are coated with lead oxide. Usually, the lead oxide is present in a proportion of from about 2% to about 10% by weight, and, in extreme cases, as high as about 20%. It is possible, in some cases, to keep the amount of lead oxide down to 0.1–0.2% by weight. The by-product lead sludge will sometimes contain iron salts, such as ferric chloride, ferric sulfate and iron sulfides, when an iron compound (usually ferric chloride) is employed as an ingredient of the still aid. By-product lead sludge of the above character is also produced in the production of other lead alkyls by similar reactions and in the production of tetraethyllead and like lead alkyls by other reactions.

The recovery of the lead in refined form from such impure by-product lead sludge has been difficult and has required a series of treatments which are inconvenient and costly. Usually, the impure by-product lead sludge has been refined by melting it in a reverberatory furnace at a temperature of from about 700° C. to about 900° C. to form an upper layer of slag and a lower layer of molten lead consisting of most of the metallic lead originally present in the impure by-product lead sludge. A temperature of at least 700° C. is required in the furnace to remove the lead oxide coating from the lead particles and release the molten metallic lead therefrom. The lower layer of molten lead is drawn off and cast in the form of pigs, a dross usually being formed during the casting and being recovered as skimmings. The slag and the dross are then further treated to recover their lead content.

The slag material is composed mainly of lead oxide, occluded lead, sodium chloride and minor proportions of other metal compounds such as lead chloride, sodium hydroxide, sodium carbonate, and ash residue and, sometimes, minor proportions of lead sulfate, lead chromate, lead sulfide and iron salts. Such slag material is normally in the form of a high melting, highly viscous, pasty or solid mass which holds a material amount of metallic lead dispersed therein, the metal compounds therein preventing the dispersed molten lead particles from coalescing the passing into the lower layer of molten lead. When the impure by-product lead contains iron or iron compounds, they also appear in the slag, tending to concentrate as solid particles at the interface of the slag and the molten lead layers, interfering with the efficiency of contact between those layers and the passage of the molten lead from the slag layer into the molten lead layer. Heretofore, such slag materials have been shipped to another plant for reclamation of their lead content, usually by treatment with iron oxide, calcium carbonate and coke at high temperatures in a blast furnace.

Denison, in U.S. Patent No. 2,692,197, has disclosed a method of refining the impure by-product lead sludge by treating it with molten sodium hydroxide to form a lower layer of molten metallic lead and an upper layer of molten caustic containing the slag materials. The resulting mixture of caustic and slag materials must be further treated to recover the lead therefrom.

Larson, in U.S. Patent No. 2,691,575, discloses the treatment of lead oxide slag materials with fused sodium hydroxide and metallic sodium to reduce the lead oxide to metallic lead. While effective, such process and the process of Denison have the disadvantage that they cannot be operated practically in the existing conventional reverberatory furnaces because the fused caustic, particularly in the large amounts employed, severely and rapidly attacks the ceramic linings of the furnaces. The replacing of such linings with suitable alkali resistant materials is costly. Also, such processes require the use of considerable amounts of sodium hydroxide which are difficult to recover. Furthermore, in the process of Larson, it is difficult to convert all of the lead compounds to metallic lead.

Kreimeier, in U.S. Patent No. 2,899,296, discloses the treatment of by-product lead sludge and slag materials with fused sodium cyanide to reduce the lead oxide to metallic lead and to effect a coalescence of the metallic lead globules into a lower layer of molten lead. Although the process is effective in reducing the lead content of the lead sludge and slag, particularly the combined lead content, the free lead remaining in suspension frequently exceeds the amount permissible for throwing away the slag without further treatment for lead recovery. Also, the sodium cyanide may adversely affect the furnace life by attacking the linings of the furnace.

It is an object of this invention to provide a new and improved process for recovering lead from by-product lead materials of the character of those produced in the manufacture of tetraethyllead. A particular object is to provide such a process for recovering lead from sludge and slag materials of such character. Another object is to provide such a process wherein substantially complete recovery of the lead in a highly purified condition is obtained by a single treatment. A further object is to provide such a process wherein the impurities are obtained substantially free of lead and other valuable materials so that they do not require further treatment to recover valuable materials and it is economical to throw them away. A still further object is to provide such a process which reduces the amounts of materials employed and the amount of handling required, with resulting economics and reductions in cost. Still other objects will appear hereinafter.

The above and other objects may be accomplished according to this invention which comprises the process for recovering metallic lead from a by-product lead material which contains lead compounds and which is of the character of those obtained in the manufacture of tetraethyllead, which process comprises heating said by-product lead material at a temperature in the range of from about 600° C. to about 750° C. in the presence of carbon in a proportion corresponding to at least about 25% excess over that theoretically required to react with the lead compounds and convert them to metallic lead, and from about 0.25% to about 30% by weight of the by-product lead material of a flux which consists essentially of from about 3% to about 40% by weight of sodium chloride and from about 97% to about 60% by weight of a mixture of potassium carbonate and sodium carbonate in which the potassium carbonate constitutes from about 10% to about 90% by weight of the mixture, the temperature being sufficient to maintain said flux in a molten state, and separating molten metallic lead from the reaction mixture.

It has been found that, under such conditions, the flux is melted and mixes with the by-product lead materials, including the slag, to produce a mobile fluid molten mass, to maintain the mass in molten condition, and to strip oxide coatings from the lead particles. The carbon is enabled to efficiently convert the lead compounds (chemically combined lead such as lead oxide and lead salts) to metallic lead. The molten lead coalesces and separates from the fluid mass in a highly purified condition. Thus, a layer of purified molten lead is formed beneath an upper layer of fluid composition which is composed of the flux materials and of alkali hydroxide, sodium chloride and other unreacted non-lead containing components of the starting by-product lead material. The fluid upper layer is substantially free of lead and lead compounds. In other words, the lead values in the by-product lead material are recovered substantially completely in one step and there is produced a slag material which is substantially free of lead, either metallic or chemically combined, and which can be disposed of economically as waste. When carbon alone in the form of a coal, coke, and the like is used, the metallic lead formed by the reduction of lead compounds does not coalesce with the main body of the lead, but remains dispersed in the slag material.

The process of this invention is designed and adapted for the treatment of the by-product lead sludge from the manufacture of tetraethyllead, of slag materials remaining after a partial removal of the metallic lead from the lead sludge, and of dross accumulated from the casting of molten, recovered lead, and from the melting of lead ingots. Representative lead sludge materials obtained as by-products consist mainly of 2% to 20% by weight of lead oxide, 0% to 1% by weight of lead chloride, 0% to 2.5% by weight of sodium sulfate, 1% to 5% by weight of sodium chloride, and up to about 95% by weight of small dispersed particles of metallic lead. The amount of sodium chloride will depend upon the extent to which it has been removed from the sludge by washing, and may be absent. Also, if materials such as alkali metal sulfides, ferric chloride, or alkali metal dichromates have been used as still aids, other impurities, such as lead sulfide, iron sulfide, sodium sulfide and corresponding metal chromates, may be present in small amounts. In general, slag material, from a partial refinement of the lead sludge by heat treatment alone in a reverberatory furnace, contains the components that are present in the lead sludge in essentially the same relative proportions while the dispersed metallic lead content is up to only about 50% by weight. Representative slag materials analyze, by weight, about 10% to about 40% free lead, about 10% to about 60% combined lead, about 5% to about 25% sodium chloride, about 3% to about 10% sodium sulfate, about 0% to about 5% lead chloride, and small quantities of other salts.

This invention is particularly adapted for use in the treatment of slag materials, obtained in the purification of lead sludge, and drosses, which contain at least about 30% to about 40% by weight of lead (metallic and combined) but may be used to treat by-product lead materials which contain as little as 5% of lead. It will generally be uneconomical to treat materials containing less than 5% of lead.

The carbon employed in the process may be any of the carbonaceous materials which conventionally are employed in the reduction of metal ores or slags or lead slag materials. Such carbonaceous materials are represented by coal, coke, charcoal, graphite, and the like. Preferably, the carbonaceous material will be one which yields a minimum of ash, such as anthracite coal, coke and charcoal. The carbon usually will be employed in a proportion corresponding to at least about 25% excess over that theoretically required to react with the lead compounds and convert them to metallic lead. Ordinarily, this will be from about 0.2% to about 4% by weight of the by-product lead materials, the exact amount depending upon the combined lead content of the sludge or slag.

The flux should be a composition which consists essentially of from about 3% to about 40% by weight of sodium chloride and from about 97% to about 60% by weight of a mixture of potassium carbonate and sodium carbonate, in which the potassium carbonate constitutes from about 10% to about 90% by weight of the mixture of carbonates, preferably from about 20% to about 70%, and most preferably from about 33% to about 60% by weight. The sodium chloride in the flux composition is independent of any sodium chloride that may be present in the by-product lead material that is to be treated. Such combination of materials in the flux composition and the relative proportions thereof above specified are critical. Material variations therein outside of the ranges specified tend to result in excessively high temperatures, lower capacity for treating slag with resulting higher costs, or viscous melts that impede the separation of metallic lead. For example, a mixture of about 60% by weight of sodium carbonate and about 40% by weight of sodium chloride has a melting point of about 638° C., and such melting point rises sharply as the sodium chloride content is varied on either side of such proportion, such as by the accumulation of sodium chloride from the by-product lead material being treated.

The flux compositions of the present invention melt below 750° C. and are not so seriously effected by variations in the sodium chloride content of the by-product lead material being treated. It is preferred to employ a flux which of itself melts at about 660° C. or lower. A mixture of 7% by weight of sodium chloride, 40% by weight of sodium carbonate, and 53% by weight of potassium carbonate insures a melting point of about 650° C. As the relative proportions of sodium carbonate and potassium carbonate are varied from such proportions, it is necessary to increase the concentration of sodium chloride to maintain such low melting point. It is preferred that the flux contain from about 5% to about 35% by weight of sodium chloride. The amount of the flux composition employed will be from about 0.25% to about 30% by weight of the by-product lead material to be treated. When a slag is to be treated, the flux ordinarily will be employed in a proportion of from about 10% to about 30% by weight of the slag. When the by-product lead material contains sodium chloride, the concentration of the carbonates in the flux decreases due to dilution by the accumulation of sodium chloride from the by-product lead materials, and the fluidity of the flux mixture tends to decrease. Accordingly, in order to insure the optimum concentration of carbonates in the flux, the higher proportions of flux to by-products lead materials will be employed with those by-product lead materials which have the higher sodium chloride content.

The process may be carried out batchwise or continuously in melt pots, vessels or equipment made of materials which are resistant to attack by the treating agents employed. The process, in its preferred embodiments, is particularly adapted for operation, preferably in a continuous manner, in the ceramic-lined reverberatory furnaces conventionally employed for recovering unreacted lead from the dried lead sludges. The order of adding and mixing the treating agents is not critical. When a simple batch melt pot is used, the carbon, sodium carbonate, potassium carbonate, and sodium chloride treating agents may be added to the impure by-product lead material, the treating agents and the impure lead material may be fed to the pot simultaneously, or the by-product lead material may be added to the treating agents. The vessel may be at the process temperature during the addition of the treating agents thereto or it may be at atmospheric temperature and then heated after the addition of the treating agents. Mixing is facilitated by agitation. After the treating agents are mixed with each other and with the by-products lead material, agitation is unnecessary, but usually will be desirable in large scale operations to improve heat transfer and to ensure better physical contact of the components of the mixture.

In one procedure, the flux composition is heated to the desired process temperature to form a body of molten flux. Then the impure lead material together with the carbon is fed gradually, in increments or continuously, to the top of the molten flux with mild stirring. A substantial body of refined molten lead is accumulated and maintained beneath the body of molten flux-slag composition. Portions of the molten lead are withdrawn intermittently or continuously. At the same time, more of the flux usually is added intermittently or continuously as may be required to maintain or restore the fluidity of the flux mixture. The fluidity of the flux mixture tends to diminish as sodium chloride is added to the flux from the by-product lead material. In such a continuous process, mild agitation is preferred to promote good flux-slag contact and removal of entrained lead. The layer of molten flux and slag protects the molten lead from oxidation, and it is not necessary to employ an atmosphere of inert gas to exclude an oxygen-containing atmosphere such as air.

In another procedure, the impure by-product lead material is first heated to the desired process temperature and then the carbon, sodium carbonate, potassium carbonate, and sodium chloride are added, preferably in solid form, to such material.

One form of reverberatory furnace, which is suitable for carrying out the process of this invention, is that disclosed in the drawings and described in the specification of U.S. Patent No. 2,899,296 of Oscar R. Kreimeier, employing the general procedures and techniques described by Kreimeier in connection therewith. More particularly, the impure by-product lead material will be introduced at the feed end of the furnace and the furnace will be maintained at a temperature in the range of from about 600° C. to about 750° C. The carbon and the flux composition are also added at the feed end of the furnace in the required amounts and admixed with the by-product lead material, or dropped on it and distributed over the charge as evenly as practical. The carbon and the flux composition, when dropped onto the charge, rests momentarily on the surface of the charge, but the flux composition is melted by the heat of the flame, spreads over the surface of the by-product lead material, mixes with the bulk of the by-product lead material which it converts to a fluid mass, and the carbon converts the lead compounds to metallic lead, as the charge flows towards the discharge end of the furnace. Additional carbon and flux may be fed into the furnace at an intermediate point thereof, if desired. By such procedure, the lead values in the impure lead material are recovered substantially completely in one step in the reverberatory furnace.

In order to more clearly illustrate this invention, preferred modes for carrying it into effect and advantageous results to be obtained thereby, the following examples are given in which the parts and proportions are by weight except where specifically indicated otherwise.

*Example 1*

1200 parts of cold slag (which had been recovered from the reverberatory furnace in the partial refining of impure by-product lead from the manufacture of tetraethyl-lead and which contained 20% sodium chloride, 17% combined lead, and 32% free lead) was mixed with 36 parts of powdered anthracite coal, 134 parts of sodium carbonate, 81 parts of potassium carbonate, and 100 parts of sodium chloride, and the mixture was heated in a steel pot. At 700° C., the slag formed a fluid composition. At 720° C., reaction occurred as shown by the liberation of gaseous material. When the reaction was complete and the lead globules had settled, the molten lead which had accumulated at the bottom of the pot was cast into ingots. The carbonate-chloride slag was found to be substantially free of lead; it contained only 2.5% of free lead and 0.6% of combined lead. This corresponds to a recovery of 95% of the lead originally present in the slag taken for refinement. The recovered lead was satisfactory for conversion, by way of its alloys with sodium, into tetraethyllead.

*Example 2*

1500 parts of cold slag (which had been recovered from the reverberatory furnace in the processing of impure by-product lead from the manufacture of tetraethyllead and contained 34% free lead, 44% combined lead and 10% sodium chloride) was mixed with 60 parts of powdered anthracite coal, 100 parts of sodium carbonate, 140 parts of potassium carbonate and 60 parts of sodium chloride and the mixture was heated in a steel pot to a temperature of 680° C. to 690° C. When the reducing reaction and the liquefaction were completed, the lead which had accumulated at the bottom of the pot was cast into pigs. This lead was satisfactory for conversion by way of its alloy with sodium, into tetraethyllead. The slag layer on top contained only 5.9% free lead and 1.6% combined lead and could be discarded. The lead recovered from the by-product lead amounted to 96% of the lead originally present in the slag.

*Example 3*

To 1500 parts of cold slag (which had been recovered from the reverberatory furnace in the processing of impure by-product lead from the manufacture of tetraethyllead and contained 34% free lead, 44% combined lead and 10% sodium chloride) was added 60 parts of powdered anthracite coal, 135 parts of sodium carbonate, 65 parts of potassium carbonate and 100 parts of sodium chloride. The mixture was heated in a steel pot to a temperature of 680° C. to 690° C. At the end of the reduction and liquefaction, the lead which had accumulated in a bottom layer was cast into pigs and was found satisfactory for conversion, by way of its alloy with sodium, into tetraethyllead. The top slag layer contained 3.5% free lead and 0.6% combined lead. The lead recovered from the by-product lead amounted to 98% of the lead originally present in the slag.

*Example 4*

2350 parts of dross (accumulated from molten lead recovered in the refining of by-product lead sludge, which dross contained 10% miscellaneous salts, 36% lead oxide, and 54% free lead) were mixed 23 parts of powdered charcoal, 260 parts of sodium carbonate, 345 parts of potassium carbonate, and 45 parts of sodium chloride, and the mixture was heated in a steel pot. At about 700° C., the mixture became fluid, and a temperature of 720±20° C. was maintained for 5 minutes. The mixture separated into a lower layer of molten lead and an upper layer of slag. The lower lead layer was cast into ingots. The carbonate-chloride slag contained 0.7% combined lead and 7.8% free lead.

*Example 5*

To 500 parts of cold slag (which had been recovered from the reverberatory furnace in the processing of impure by-product lead from the manufacture of tetraethyllead and which contained 35% free lead, 34% combined lead and 14% sodium chloride) was added 10 parts of powdered anthracite coal, 70 parts of sodium carbonate, 35 parts of potassium carbonate and 15 parts of sodium chloride. The mixture was heated in a steel pot at 625° C. At the end of the reduction and liquefaction, the lead which had accumulated was cast into pigs and was found satisfactory for conversion, by way of its alloy with sodium, into tetraethyllead. The slag layer contained 3.7% free lead and 1.3% combined lead. This corresponds to a recovery of 96% of the lead present in the slag taken for recovery of the lead.

*Example 6*

To 500 parts of cold slag (which had been recovered from the reverberatory furnace in the processing of impure by-product lead from the manufacture of tetraethyllead and contained 35% free lead, 34% combined lead and 14% sodium chloride) was added 10 parts of powdered anthracite coal, 70 parts of sodium carbonate, 35 parts of potassium carbonate and 35 parts of sodium chloride. The mixture was heated in a steel pot at 625° C. At the end of the reaction (after liquefaction and reduction had occurred), the lead which had accumulated was cast into pigs and was found satisfactory for conversion, by way of its alloy with sodium, into tetraethyllead. The slag layer contained 4.8% free lead and 2.0% combined lead, whereby 94% of the lead in the slag had been recovered.

It will be understood that the foregoing examples are given for illustrative purposes solely and that this invention is not limited to the specific embodiments disclosed therein. On the other hand, it will be apparent to those skilled in the art that, within the limits set forth in the general description, the materials, proportions, equipment, conditions and procedures may be widely varied without departing from the spirit and scope of this invention.

From the preceding description, it is apparent that this invention provides a novel process for effectively recovering the lead in a satisfactorily refined form from the impure by-product lead materials which are of the character of those produced in the manufacture of tetraethyllead. Particularly, and preferably, this invention provides such a process whereby such results are obtained in a single treatment of the by-product lead materials. The process is simple and readily operated and controlled, and results in material economies over the conventional procedures employed heretofore. Accordingly, it will be obvious that this invention constitutes a valuable advance in, and contribution to the art.

The embodiments of the invention in which an exclusive property or privilege is claimed are defined as follows:

1. The process for recovering metallic lead from a by-product lead material which contains lead compounds and which is of the character of those obtained in the manufacture of tetraethyllead, which process comprises heating said by-product lead material at a temperature in the range of from about 600° C. to about 750° C. in the presence of carbon in a proportion corresponding to at least about 25% excess over that theoretically required to react with the lead compounds and convert them to metallic lead, and from about 0.25% to about 30% by weight of the by-product lead material of a flux which consists essentially of from about 3% to about 40% by weight of sodium chloride and from about 97% to about 60% by weight of a mixture of potassium carbonate and sodium carbonate in which the potassium carbonate constitutes from about 10% to about 90% by weight of the mixture of carbonates, the temperature being sufficient to maintain said flux in a molten state, and separating molten metallic lead from the reaction mixture.

2. The process for recovering metallic lead from a by-product lead material which contains lead compounds and which is of the character of those obtained in the manufacture of tetraethyllead, which process comprises heating said by-product lead material at a temperature in the range of from about 600° C. to about 750° C. in the presence of carbon in a proportion corresponding to at least about 25% excess over that theoretically required to react with the lead compounds and convert them to metallic lead, and from about 0.25% to about 30% by weight of the by-product lead material of a flux which consists essentially of from about 3% to about 40% by weight of sodium chloride and from about 97% to about 60% by weight of a mixture of potassium carbonate and sodium carbonate in which the potassium carbonate constitutes from about 20% to about 70% by weight of the mixture of carbonates, the temperature being sufficient to maintain said flux in a molten state, and separating molten metallic lead from the reaction mixture.

3. The process for recovering metallic lead from a by-product lead material which contains lead compounds and which is of the character of those obtained in the manufacture of tetraethyllead, which process comprises heating said by-product lead material at a temperature in the range of from about 600° C. to about 750° C. in the presence of carbon in a proportion corresponding to at least about 25% excess over that theoretically required to react with the lead compounds and convert them to metallic lead, and from about 0.25% to about 30% by weight of the by-product lead material of a flux which consists essentially of from about 5% to about 35% by weight of sodium chloride and from about 95% to about 65% by weight of a mixture of potassium carbonate and sodium carbonate in which the potassium carbonate constitutes from about 20% to about 70% by weight of the mixture of carbonates, the temperature being sufficient to maintain said flux in a molten state, and separating molten metallic lead from the reaction mixture.

4. The process for recovering metallic lead from a slag which contains lead compounds and which is obtained in the refining of impure by-product lead produced in the manufacture of tetraethyllead, which process comprises heating said slag at a temperature in the range of from about 600° C. to about 750° C. in the presence of carbon in a proportion corresponding to at least about 25% excess over that theoretically required to react with the lead compounds and convert them to metallic lead, and from about 10% to about 30% by weight of the slag of a flux which consists essentially of from about 3% to about 40% by weight of sodium chloride and from about 97% to about 60% by weight of a mixture of potassium carbonate and sodium carbonate in which the potassium carbonate constitutes from about 10% to about 90% by weight of the mixture of carbonates, the temperature being sufficient to maintain said flux in a molten state, and separating molten metallic lead from the reaction mixture.

5. The process for recovering metallic lead from a slag which contains lead compounds and which is obtained in the refining of impure by-product lead produced in the manufacture of tetraethyllead, which process comprises heating said slag at a temperature in the range of from about 600° C. to about 750° C. in the presence of carbon in a proportion corresponding to at least about 25% excess over that theoretically required to react with the lead compounds and convert them to metallic lead, and from about 10% to about 30% by weight of the slag of a flux which consists essentially of from about 5% to about 35% by weight of sodium chloride and from about 95% to about 65% by weight of a mixture of potassium carbonate and sodium carbonate in which the potassium carbonate constitutes from about 20% to about 70% by weight of the mixture of carbonates, the temperature being sufficient to maintain said flux in a molten state, and separating molten metallic lead from the reaction mixture.

6. The process for recovering metallic lead from a slag which contains lead compounds and which is obtained in the refining of impure by-product lead produced in the manufacture of tetraethyllead, which process comprises heating said slag at a temperature in the range of from about 600° C. to about 750° C. in the presence of carbon in a proportion corresponding to at least about 25% excess over that theoretically required to react with the lead compounds and convert them to metallic lead, and from about 10% to about 30% by weight of the slag of a flux which consists essentially of from about 5% to about 35% by weight of sodium chloride and from about 95% to about 65% by weight of a mixture of potassium carbonate and sodium carbonate in which the potassium carbonate constitutes from about 33% to about 60% by weight of the mixture of carbonates, the temperature being sufficient to maintain said flux in a molten state, and separating molten metallic lead from the reaction mixture.

References Cited in the file of this patent

UNITED STATES PATENTS

| | | |
|---|---|---|
| 6,062 | Parkes | Jan. 30, 1849 |
| 2,365,177 | Dittmer | Dec. 19, 1944 |
| 2,834,669 | Pendar | May 13, 1958 |

FOREIGN PATENTS

| | | |
|---|---|---|
| 163,264 | Australia | Jan. 29, 1953 |